(12) United States Patent
Wang et al.

(10) Patent No.: US 8,937,848 B2
(45) Date of Patent: Jan. 20, 2015

(54) METHODS AND SYSTEMS TO ELIMINATE UNDESIRABLE VARIATIONS IN TIME-LAPSE SEISMIC SURVEYS

(75) Inventors: Yi Wang, Katy, TX (US); Richard Bale, Calgary (CA); Sergio Grion, Horley (GB)

(73) Assignee: CGGVeritas Services SA, Massy, Cedex (FR)

( * ) Notice: Subject to any disclaimer, the term of this patent is extended or adjusted under 35 U.S.C. 154(b) by 780 days.

(21) Appl. No.: 13/190,763

(22) Filed: Jul. 26, 2011

(65) Prior Publication Data

US 2012/0026830 A1     Feb. 2, 2012

Related U.S. Application Data

(60) Provisional application No. 61/368,096, filed on Jul. 27, 2010.

(51) Int. Cl.
G01V 1/38     (2006.01)
G01V 1/36     (2006.01)

(52) U.S. Cl.
CPC ..... *G01V 1/38* (2013.01); *G01V 1/364* (2013.01); *G01V 2210/612* (2013.01)
USPC ............................................. 367/24; 367/21

(58) Field of Classification Search
CPC .... G01V 1/364; G01V 1/38; G01V 2210/612
USPC ..................................................... 367/21, 24
See application file for complete search history.

(56) References Cited

U.S. PATENT DOCUMENTS

2010/0135112 A1   6/2010   Robertsson

FOREIGN PATENT DOCUMENTS

GB     2 405 473 A     3/2005

OTHER PUBLICATIONS

Mehta et al, "Strengthening the Virtual Source method for time-lapse monitoring", Geophysics, vol. 73, No. 3 May-Jun. 2008 ; p. S73-S80.*
Amundsen et al, "Elimination of Free Surface-related Multiples Without Need of the Source Wavelet", Conference Paper, Document IDSEG-1999-1064, 1999 SEG Annual Meeting, Oct. 31-Nov. 5, Houston, Texas.*
Celine Lacombe, et al.; "Correcting for water-column variations"; The Leading Edge; Special Section: Statistics; Feb. 2009; pp. 198-201.
Richard Bale, et al.; "Plane Wave Deghosting of Hydrophone and Geophone OBC Data"; 1998 SEG Expanded Abstracts.

(Continued)

*Primary Examiner* — Ian J Lobo
(74) *Attorney, Agent, or Firm* — Patent Portfolio Builders PLLC

(57) ABSTRACT

Device and method for processing 4-dimensional (4-D) seismic traces. The method includes receiving at least two vintages of seismic traces recorded by seismic receivers for a same subsurface area, wherein said seismic receivers are located at the ocean floor; applying up-down deconvolution to each of said vintages of seismic traces to obtain a representation of a reflectivity of said subsurface area from each vintage of seismic traces; and redatuming the up-down deconvolution result of each vintage from the ocean floor to a desired water depth of the ocean to reduce one or more changes in said seismic traces associated with water layer variations between recordings of said series of seismic traces. The redatumed seismic data is used to generate one or more images representing characteristics of said subsurface area.

20 Claims, 6 Drawing Sheets

(56) References Cited

OTHER PUBLICATIONS

Yi Wang, et al.; "What Comes Up Must Have Gone Down: the Principle and Application of Up-Down Deconvolution for Multiple Attenuation of Ocean Bottom Data"; XP55032413; Focus Article; CSEG Recorder, Dec. 2009; pp. 16-20.

Yi Wang, et al.: "Up-Down Deconvolution for Surface-related Multiple Attenuation of Ocean Bottom Data"; 72nd EAGE Conference and Exhibition, XP55032437; SPE EUROPEC 2010 Barcelona, Spain, Jun. 14-17, 2010.

R. Behrens, et al.; "Practical Aspects of 4D Seismic: What an Engineer Needs to Know" Petrole Et Techniques, Association Francaise Des Techniciens du Petrole, No. 421; XP0000958801; Jul. 1, 1999; pp. 44-45, Paris, France.

N. Vedanti, et al.; "Time Lapse (4D) Seismic: Some Case Studies"; Earth Science India vol. 2 (IV); XP55032440; Oct. 2009; pp. 230-248.

Yi Wang, et al.; "The ups and downs of ocean bottom seismic processing; applications of wavefield separation and up-down deconvolution" Leading Edge, XP55032443; retrieved on Oct. 1, 2010.

International Search Report and Written Opinion issued in related application No. PCT/EP2011/062953, mailed on Jul. 25, 2012.

\* cited by examiner

METHODS AND SYSTEMS TO ELIMINATE UNDESIRABLE VARIATIONS IN TIME-LAPSE SEISMIC SURVEYS

CROSS REFERENCE TO RELATED APPLICATIONS

This Non-Provisional application claims priority under 35 U.S.C. §119(e) on U.S. Provisional Application No. 61/368,096 filed on Jul. 27, 2010, the entire contents of which are hereby incorporated by reference into the present application.

TECHNICAL FIELD

The present disclosure relates generally to geophysics and, in particular, to methods and systems to eliminate undesirable variations in time-lapse seismic surveys. More specifically, the present disclosure concerns using up-down deconvolution to remove undesirable variations between two or more sets of seismic survey data for the same location acquired at different times.

BACKGROUND OF THE INVENTION

In the oil and gas industry, one widely used technique to search for oil and/or gas is to conduct seismic surveys to study subsurface formations. Typically, in seismic surveys, geophysicists use "seismic reflection" techniques to produce an image of the subsurface formations. These techniques generally involve emitting acoustic signals from a seismic energy source that propagate into the earth and recording the signals that are at least partially reflected by the layers of the subsurface formation that have different acoustic impedances. These recorded signals, also called seismic traces, are then processed to render images showing the characteristics or topography of the subsurface area that was surveyed. Typically, processing of seismic traces (raw data) begins with deconvolution, which often improves temporal resolution by collapsing the seismic wavelet to approximately a spike and suppressing reverberations on some field data. In addition, deconvolution also yields a representation of subsurface reflectivity. The next process is conventionally common-midpoint (CMP) or common-conversion point (CCP) stacking, including accompanying processes such as noise attenuation, wavefield separation, multiple attenuation, velocity analysis, normal-moveout (NMO), and statics corrections. Migration is typically a third means to process seismic data. Migration generally corrects and improves initial assumptions that the surveyed formation contains near-horizontal layers. Further, migration is an imaging process that yields a seismic image of the subsurface.

In marine seismic surveying, one method to obtain the seismic data of subsurface formations is ocean bottom recording. Generally, there are two main types of ocean bottom recording: (1) ocean bottom cable (OBC) and (2) ocean bottom seismometer or node (OBS or OBN). In OBC recording, typically, a cable containing multi-component sensors, e.g., geophones and hydrophones, is deployed from a seismic recording vessel to the seafloor using an umbilical connection. The sensors record the seismic data and relay the information to the vessel through the umbilical connection. The spacing arrangement of the multicomponent sensors on the sea floor is similar to that of towed streamers. In OBS acquisition, typically, a number of multicomponent nodes are deployed individually to the sea floor, usually by a remote operated vehicle (ROV). Generally, the typical receiver spacing is between 100 and 400 meters.

In both OBC and OBS acquisition, most modern systems make use of four component (4-C) sensors, consisting of a 3-C geophone and a hydrophone. This allows recording of the full elastic wavefield and separation of the up- and down-travelling waves because hydrophone and geophone respond differently to up- and down-travelling waves.

A hydrophone is a pressure-sensitive seismic detector that is typically used for receivers in marine seismic data acquisition because it enables recording of acoustic energy underwater by converting acoustic energy into electrical energy. Most hydrophones are based on a piezoelectric transducer that generates electricity when subjected to a pressure change. Such piezoelectric materials, or transducers, can convert a sound signal into an electrical signal. A geophone is a velocity-sensitive seismic detector that is typically used for receivers in land seismic data acquisition because it converts ground movement, e.g., particle velocity, into electrical energy—voltage, which may be recorded. The output voltage is proportional to ground velocity.

While the waves propagating through the Earth have a three-dimensional characteristic, geophones are generally constrained to respond to a single dimension, usually in the vertical direction. Some applications may require the recording of the full wave, requiring more specialized equipment such as a three-component (3-C) geophone. Typically, a 3-C geophone comprises three moving coil elements that are mounted in an orthogonal arrangement within a single case. As seen, the combination of both geophone and hydrophone allows recording of the full elastic wavefield and its separation into up- and down-going parts.

Reasons for acquiring OBC or OBS data include the presence of obstructions that make streamer acquisition difficult or impractical, wide azimuth illumination, the ability to also record shear-wave data, a quieter recording environment, higher resolution, among other advantages. Moreover, repeated OBS surveys are an effective tool for time-lapse reservoir monitoring to study the changes taking place in reservoirs over time, particularly producing reservoirs, thereby allowing for the monitoring of fluid, pressure and geomechanical changes. As such, time-lapse seismic imaging of oil and gas reservoirs or "4-D" seismic modeling can provide significant improvements in recovery rates of hydrocarbons and reduce drilling and production costs and risks.

Accordingly, it is desirable to acquire high-fidelity and repeatable 4-D OBS data to reveal subtle changes in the signals which are representative of reservoir changes. That is, 4-D seismic data analysis usually requires high-fidelity seismic data with very high signal-to-noise ratio levels in which, ideally, noise factors are repeatable. As such, it is necessary to minimize all possible differences between surveys that are inevitably caused by changes in acquisition and processing algorithms between vintages of seismic data of the same field or reservoir. Therefore, in 4-D seismic exploration it is desirable to make the acquisition of distinct data vintages as repeatable as possible.

Generally, there are several ways of minimizing these differences. For example, sensor or receiver positions can be made repeatable by permanent deployment of buried hydrophone and geophone sensors at the ocean bottom. Another approach involves using OBN (Ocean Bottom Nodes) which can be positioned very near to the original survey position for subsequent surveys to minimize variations. While receiver-side repeatability may be easily addressed it is extremely difficult to achieve complete repeatability on the source side because of variations in the water column and in the location where the shots are produced. One possible way to address the shot-location problem is to produce the shots in the exact locations or as close to exact as possible. The water column variation problem, however, is more difficult to address because water column variations are caused by many uncontrollable factors, such as tidal effects, sea-water temperature, salinity changes, as well as source-side ghost variations due to variations in sea-surface conditions.

To minimize these water column variations, the current state of the art is to attenuate these undesirable variations with a combination of moveout corrections and static shifts. One example of these methods is disclosed in Lacombe et al., 2009, Correcting for water-column variations, The Leading Edge, pp. 198-201. One disadvantage of these methods is that knowledge of the water velocities and tides is required, and the velocity and tide information is often difficult to obtain. Further, there are other significant drawbacks and limitations to these prior art seismic data processing methods. For example, these corrections methods do not address sea surface variability, e.g., rough sea. In addition, often, a post-stack matching step is required to account for unresolved differences. Further, conventional methods do not address source-side multiples that may vary between surveys due to water-column changes. In general, the current state of the art does not properly account for differences in directivity between surveys. Also, the conventional methods cannot compensate for the difference in subsurface illumination caused by the water column velocity change between vintages. Moreover, these methods cannot be applied to ocean bottom data with sources and receivers located at two different depth levels.

In view of the drawbacks of methods known in the art, there is a great need for seismic data processing to remove water column effect from 4-D ocean bottom seismic data. The present disclosure provides for improved methods and systems that produce high-fidelity and repeatable 4-D ocean bottom seismic data.

BRIEF SUMMARY OF THE INVENTION

One object of the invention is to provide for repeatable 4-D seismic data.

Another object of the invention is to attenuate changes in 4-D seismic traces associated with water column effect.

One or more embodiments of the present invention overcome the problems associated with methods known in the art. In particular, one or more exemplary embodiment uses the up-down deconvolution method to compensate for water column changes without knowledge of water velocity and depth changes or variations between vintages. As such, one or more embodiments allows for attenuation of the undesirable changes without requiring additional data. In addition, one or more embodiments also removes residual source-side water column multiples which affect 4-D seismic repeatability. Additionally, one or more embodiments provides shot signature deconvolution and source directivity deconvolution, while the prior art methods that are used to minimize water column variations in 4-D seismic data do not. Further, one or more embodiments can redatum sources to sea-surface at the same level with a constant water velocity, so the subsurface illumination is kept the same between vintages. Also, one or more embodiments removes differences in the sea-surface state between surveys and replaces them with an ideal flat sea surface. Moreover, the embodiments of the present invention can also be directly applied to the converted-modes recorded on horizontally polarized detectors To meet the above objectives, there is provided, in accordance with one aspect of the invention, a method for processing 4-D seismic traces. The method comprising the steps of providing at least two vintages of seismic traces recorded by seismic receivers for the same subsurface area, where the seismic receivers are located at the ocean floor; applying up-down wavefield separation; applying up-down deconvolution to each of said vintages of seismic traces to obtain a representation of the reflectivity of the subsurface area and redatuming the up-down deconvolution result of each vintage from the ocean floor to the surface or any depth of the ocean to reduce one or more changes in the seismic traces, where the changes are associated with water column variations between vintages; and where the redatumed seismic data is used to generate one or more images representing the characteristics of said subsurface area.

In an exemplary embodiment, the same water velocity for all vintages of data is used to redatum the up-down deconvolution result, where the redatuming attenuates changes in water velocity between recordings of the vintages of seismic traces.

In another exemplary embodiment, the same water depth for all vintages of data is used to redatum the up-down deconvolution result, where the redatuming attenuates changes in water depth between recordings of the vintages of seismic traces.

In another exemplary embodiment, the same water velocity and the same water depth for all vintages of data is used to redatum the up-down deconvolution result, where the redatuming attenuates changes in water depth between recordings of the vintages of seismic traces.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

One or more embodiments is directed to a method for minimizing the water column effect from 4-D ocean bottom seismic data by applying up-down deconvolution to 4-D ocean bottom seismic data. The detailed explanation of the mathematical basis of the up-down deconvolution method to address free surface-related water column multiples in a layered media is provided by Amundsen, L., 1993, Wavenumber-based filtering of marine point source data, Geophysics, 58, pp. 1335-1348, which is hereby incorporated by reference. As discussed in the same reference, the method is applicable not only to the pressure and vertical components deconvolution process, but it is also applicable to the horizontal components by replacing the up-going wavefield in up-down deconvolution with the horizontal component of interest. Without loss of generality, the mention of the use of up-down deconvolution in the disclosure is meant to be illustrative and not limiting. It is understood that an exemplary embodiment also applies to the horizontal components.

Further, the various embodiments of the present invention can be implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 1:
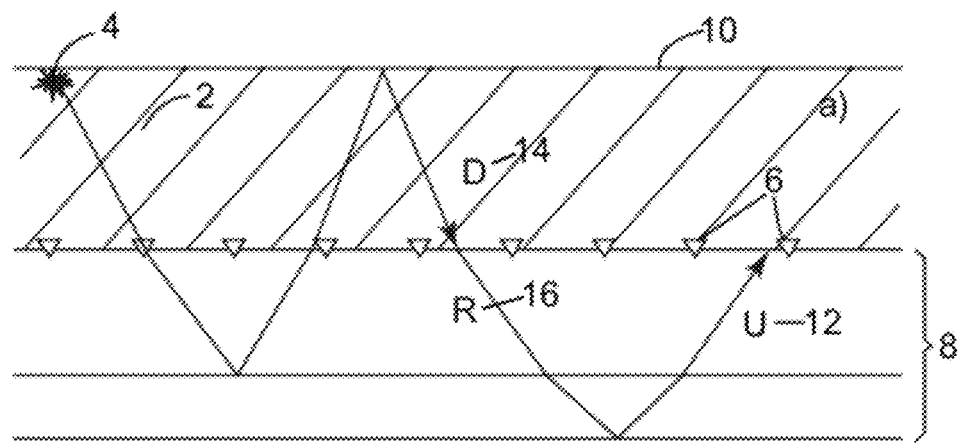
FIG. 1 is an illustration of the response of a seismic signal to the different impedances of a subsurface formation.

FIG. 1 illustrates a simple ray-path 2 of seismic signals generated by seismic source 4 and recorded by receiver 6 after seismic ray-path 2 has propagated through and reflected by the layered subsurface formation 8. While the embodiments of this invention are applicable to the wavefield as a whole, FIG. 1 shows only ray-path 2 and subsurface formation having only two layers, or reflecting interfaces, for the sake of simplicity and is not meant to be limiting. In reality, there are numerous ray-paths and layers of generic shapes. In the preferred embodiment, the source wavefield is generated near the ocean surface (the free surface) 10 where the seismic source 4 is towed by a seismic vessel (not shown). Also, preferably, the receivers are ocean bottom recorders, which include but are not limited to ocean bottom cable (OBC) and ocean bottom seismometer or node (OBS or OBN). As demonstrated by FIG. 1, due to the nature of the receivers being located at the ocean floor in ocean bottom acquisition, practically all the signals the receivers 6 record are the result of a signal that originally traveled downward from the source, from various bounces off the free surface, or a combination of both. The receivers 6 record all signals regardless of their nature, e.g., whether they bounced off the free surface or came from the source. As seen, the recorded signals have been modified by the earth's reflectivity, which is precisely the information the seismic survey seeks to obtain.

In FIG. 1, a recorded up-going signal 12 is represented as the combination of (i) a down-going signal 14 bouncing off free surface 10 and (ii) the earth's reflectivity 16. Due to the difference in the impedance of the layers of formation 8, some of the energy of seismic ray-path 2 will be reflected off the reflecting boundary where the impedance changes, while other portions of the energy will be transmitted through the boundary. FIG. 1 shows the portion of seismic ray-path 2 that continues to propagate through the layers of formation 8 and is reflected by the second layer.

Because seismic data is recorded into what is termed the time-domain, one or more processing routines are often required to transform the data into a new domain where the recorded seismic signals can be more easily separated from noise. For a simple layered medium, as one that is depicted by FIG. 1, the additional travel time implied by the combination of these two ray-paths, 12 and 16, is represented by a convolution for a common ray-parameter. Convolution in the time domain can be represented in the frequency domain as a multiplication according to the following equation:

$$U = DR \quad (1)$$

In equation 1, U is the measured up-going wavefield, R is the earth's reflectivity 16 and D is the down-going wavefield, all expressed in the F-K domain. The FK domain is obtained using a two-dimensional Fourier transform over time and space, where F is the frequency (Fourier transform over time) and K refers to wave-number (Fourier transform over space). For 3-D applications, the Fourier transform domain is F-Kx-Ky. Preferably, a Fourier transform is applied over time, and a two-dimensional Fourier transform is applied over space along two orthogonal directions, x and y. F is the frequency, Kx and Ky are horizontal wavenumbers along the two orthogonal directions. The earth response R can be obtained by deconvolving the up-going wavefield U with the corresponding down-going wave-field D. In other embodiments, the Tau-P transform can be used. The tau-p transform changes the seismic data from the time-space domain to intercept-time ray-parameter domain. For 3-D applications, the tau-p domain the input data that are stacked along a series of straight lines are replaced by planes, and the transform is referred to as tau-px-py. In other alternative embodiments, other transforms can be used to obtain a transformed up and down-going wavefield U and D.

Once the equation is in the transformed domain, an inversion can be performed to derive R using a stabilization factor $\epsilon$ to prevent noise resulting from spectral notches. The inversion results in an estimate of the earth reflectivity in the form of the following equation, which remains in the transformed domain.

$$R = \frac{U\overline{D}}{D\overline{D} + \varepsilon^2} \quad (2)$$

where $U\overline{D} = (D\overline{D})R$
$\overline{D}$ is the complex conjugate of the down-going wavefield D, and
$\epsilon^2$ is a stabilization factor, which is introduced to prevent excessive amplification of noise. Other similar methods to prevent excessive amplification of noise known to those skilled in the art can also be used.

As seen, the up-going wavefield U and the down-going wavefield D are determined before equation (2) is applied to determine the reflectivity R. Methods for the calculation of up-going and down-going wavefields are well known to those skilled in the art. Any of these known methods to determine the up- and down-going wavefields can be used in the present invention. Preferably, the up-going and down-going wavefields are estimated using the PZ summation method above the seabed, which is described with respect to FIG. 2. The PZ summation method is also referred to as wavefield separation method in the literature. However, other methods may be used to determine the up-going and down-going wavefields.

Figure 2:
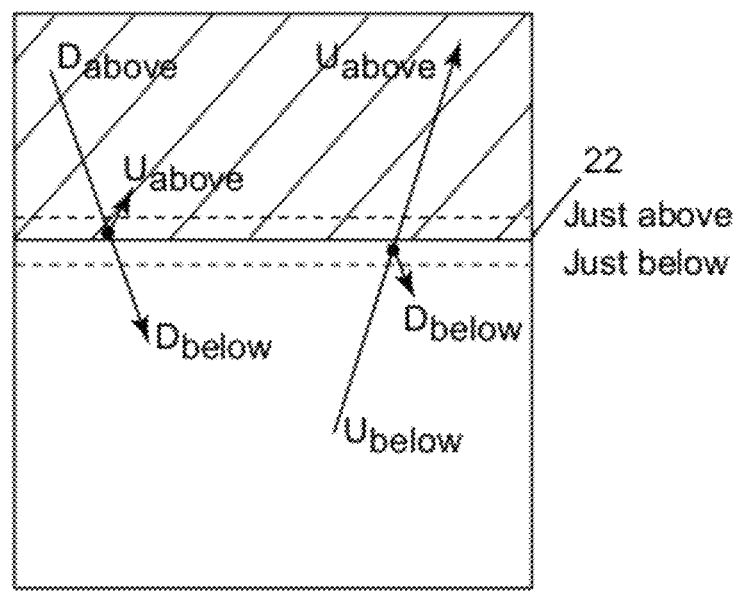
FIG. 2 is an illustration of the up-going and down-going events just above and just below the sea bed.

FIG. 2 shows the up-going and down-going events just above and just below the seabed 22, where $D_{above}$ is the down-going event just above the seabed 22 and $U_{above}$ is the up-going events above the seabed 22. The up-going events can result from reflection off of the seabed 22 or other reflecting interfaces in the subsurface formation. The down-going events result from reflection off the free surface above. Conversely, $D_{below}$ is the down-going event just below the seabed 22 and $U_{below}$ is the up-going events just below the seabed 22. For a simple case of vertical propagating waves, the equations which describe the summation above the seabed are $$U_{above} = \frac{P + (\rho c / \cos\theta)Z}{2} \text{ and} \quad (3)$$

$$D_{above} = \frac{P - (\rho c / \cos\theta)Z}{2} \quad (4)$$

In equations 3 and 4, P and Z are the hydrophone and vertical geophone recordings, respectively; and U and D are the estimated up-going wavefield and down-going wave-field just above the seabed, respectively. In equations 3 and 4, $\rho$ is the water density and c the water velocity in proximity of the sensor, and $\theta$ is the incident angle of the wave-field at the receiver. As such, the PZ summation can be applied either above or below the seabed by adjusting the scaling of the Z component before summation. The cos(theta) term takes into account the wavefield arrival angles, see for example the disclosures of Bale, R. A., 1998, Plane wave deghosting of hydrophoen and geophone data: 68th Ann. Internat. Mtg., Soc. Expl. Geophys., Expanded Abstracts, 730-733, which is hereby incorporated by reference.

Figure 5:
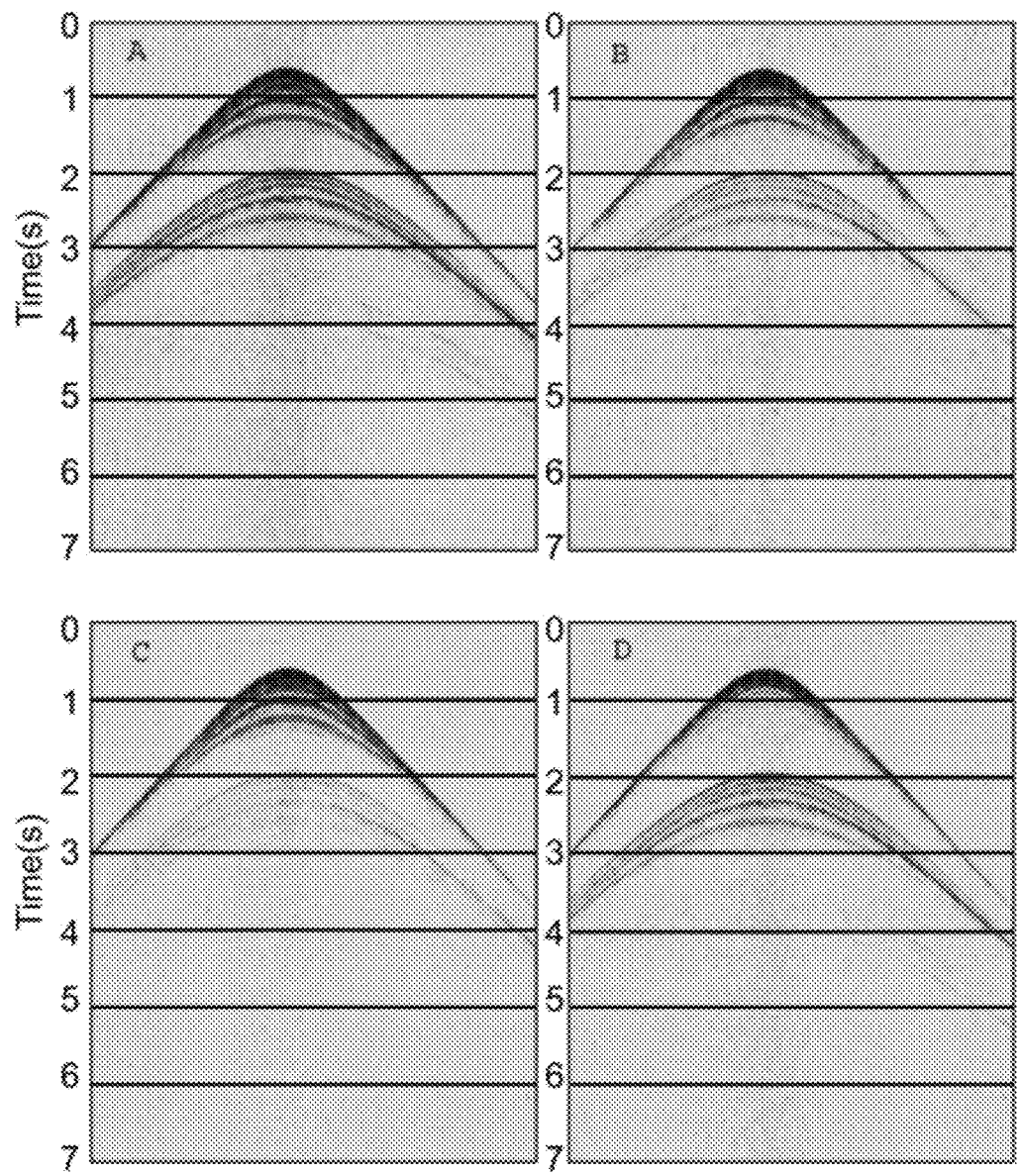
FIG. 5 is an illustration of the wavefields of the present invention.

FIG. 5 illustrates the wavefield recording of the hydrophone P and vertical geophone Z and the up-going wavefield U separated from the down-going wavefield D. In FIG. 5, panel A shows the data from the hydrophone P, panel B shows the calibrated data from the vertical geophone component Z, and panel C shows the up-going wavefield U, which have been separated from the down-going wavefields D of panel D.

Figure 6:
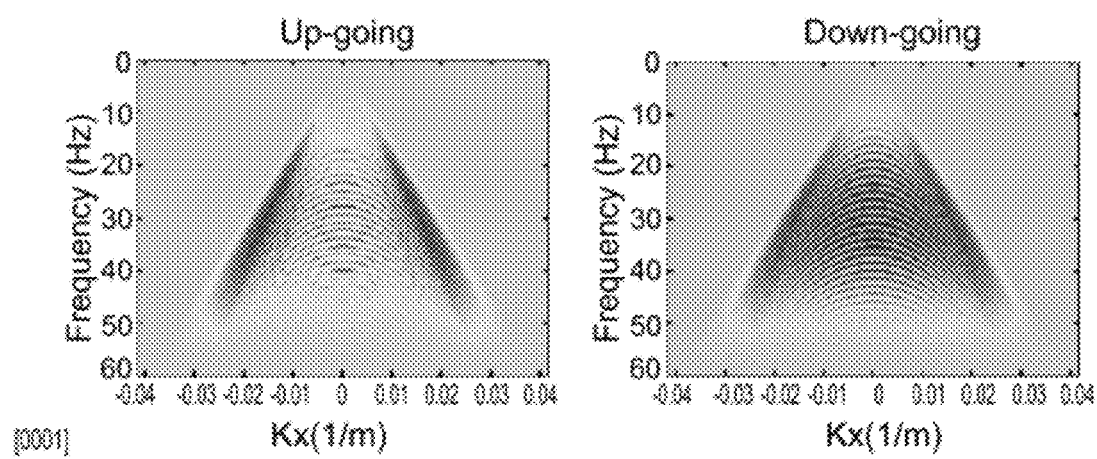
FIG. 6 is an illustration of the separated wavefields of the present invention in the frequency domain.

After the up-going and down-going wavefields are calculated, they are transformed out of the time domain and into another domain. FIG. 6 demonstrates the up-going and down-going wavefields of 2-D seismic data that are in the frequency-wavenumber domain.

Figure 3:
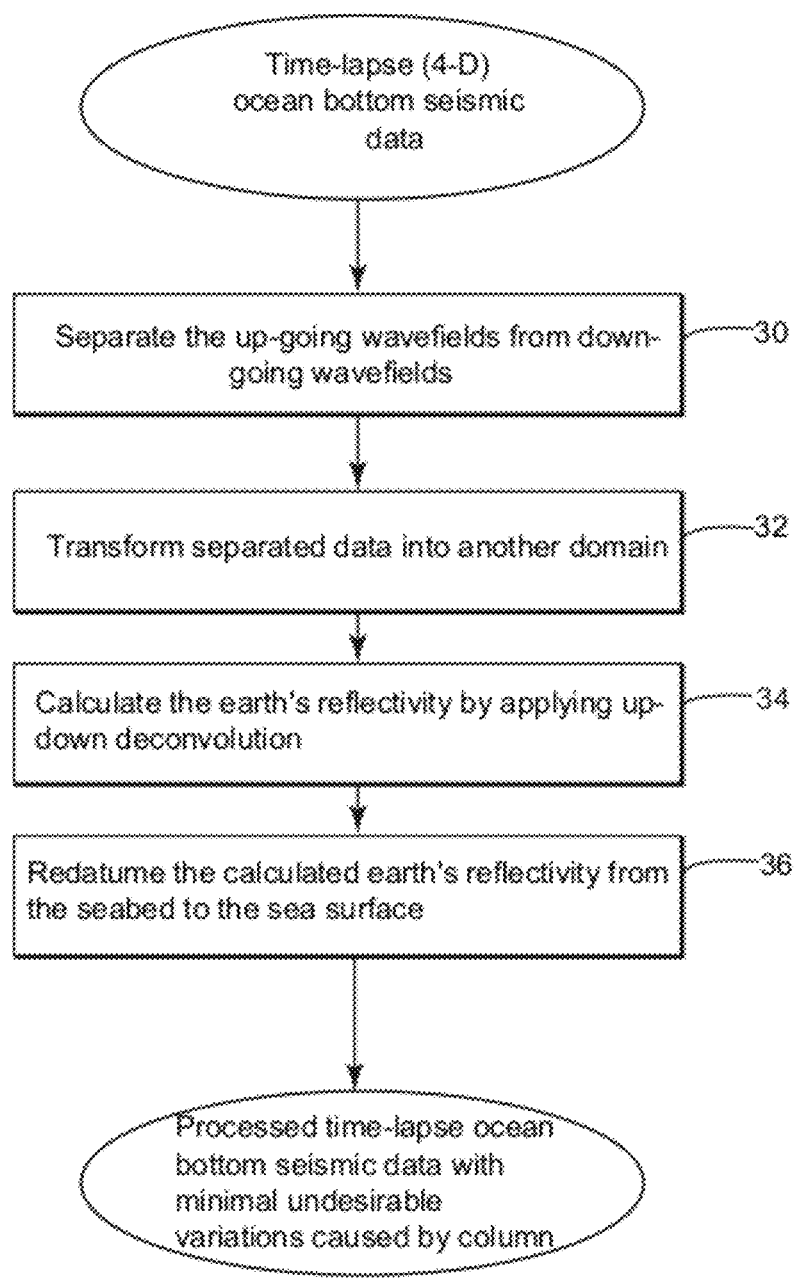
FIG. 3 shows one preferred embodiment of the present invention.

As further discussed in the following paragraphs, the present disclosure provides for a method to minimize the water column effect from 4-D ocean bottom seismic data by applying up-down deconvolution to 4-D ocean bottom seismic data. FIG. 3 shows an exemplary embodiment of the method according to the invention to process 4-D ocean bottom seismic data to eliminate variations in the water column. The data processing begins with step 30 where the up-going and down-going wavefields are estimated from the seismic data. Preferably, the separation of the seismic data into total up-going and total down-going wavefields can be achieved with a PZ summation process.

Generally for a PZ summation, the vertical geophone data Z is calibrated against the hydrophone data P, assuming the hydrophone has a good coupling with the sea water. The calibration is applied to compensate for the difference of sensor response and coupling of the hydrophone. Subsequently, a summation of the P and calibrated Z data is performed, either in the time domain or in another domain such as the F-K or tau-p domain, to obtain the up-going wave-fields U. Next, the up-going wavefields U are subtracted from the data P to obtain the down-going wave-field D. While the PZ summation is preferred, it is envisioned that other embodiments may use other methods known in the art to separate the wavefields.

Once the up-going and down-going wavefields have been obtained, the next step 32 is to transform the data out of the time-domain into another domain. Various transforms known to those skilled in the art can be used. In the preferred embodiment, Fourier transform is used to transform the 2-D seismic data into the F-K domain while 3D seismic data in the horizontal and vertical directions is transformed into the F-Kx-Ky domain, respectively. Other embodiments can also use the Tau-P or P-omega transforms, or other transforms such as the curvelet transform. One or more embodiments is not limited to the choice of a particular transform.

After transformation, the next step 34 is to deconvolve the down-going waves from the up-going waves for each receiver. The deconvolution can be achieved with the inverse transform and a stabilization factor, which is introduced to prevent excessive amplification of noise. Other similar methods to prevent excessive amplification of noise known to those skilled in the art can also be used.

In other embodiments, seismic data interpolation, e.g., data missing near offsets, and regularization may be required before the up-down deconvolution method of the present invention can be applied. The interpolation and regularization usually map the data from the original sparse irregular space geometry to a dense regular space geometry.

Additionally, one or more embodiments provides shot signature deconvolution and source directivity deconvolution when the prior art methods to minimize water column variations in 4-D seismic data do not. Shot signature deconvolution is a step in seismic processing by which the signature of the seismic source in the seismic trace is changed to a known, shorter waveform by using knowledge of the source waveform. If the source waveform is known for each shot, then the process also minimizes variations between seismic records that result from changes in the source output. Directivity is the preferential direction of propagation of the seismic energy emitted by the source. The up-down deconvolution eliminates the source waveform because the source waveform is contained in both the up-going wavefield U and the down-going wavefield D and a deconvolution cancels off this source term in U and D.

Figure 4:
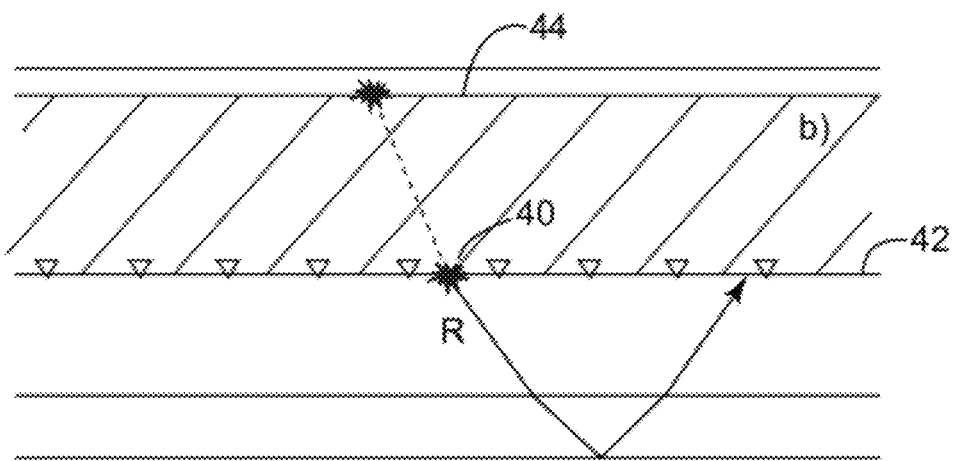
FIG. 4 is an illustration of the redatuming step of the embodiment disclosed in FIG. 3.

Referring to FIG. 4, after deconvolution, the calculated earth's response—reflectivity R—is redatumed from source 40 located at the sea floor 42 to the sea-surface 44. Referring to FIG. 3 and FIG. 4, to obtain 4-D data that is independent of water column variations, the calculated earth's response—reflectivity R—is redatumed from seabed 42 to the sea surface 44 using a set of chosen water column parameters irrespective of the actual water column characteristics, which is shown as step 36 in FIG. 3. Consequently, one or more embodiments allows for the use of the same water-column parameters for all vintages of seismic data, regardless of the actual water column parameters of each individual vintage of data.

The ability to choose the water-column parameters is particularly advantageous in numerous applications, specifically, in 4-D seismic surveying. For instance, because one or more embodiments allows for the choosing of the water-column parameters, water column changes between vintages can be compensated without knowledge of water velocity and depth changes or variations between vintages. This also provides for the removal of residual source-side water column multiples which affect 4-D seismic repeatability. Because one or more embodiments can redatum sources to sea-surface at the same level with a constant water velocity, the subsurface illumination is kept the same between vintages. These are just a few advantages provided by one or more embodiments.

Figure 7:
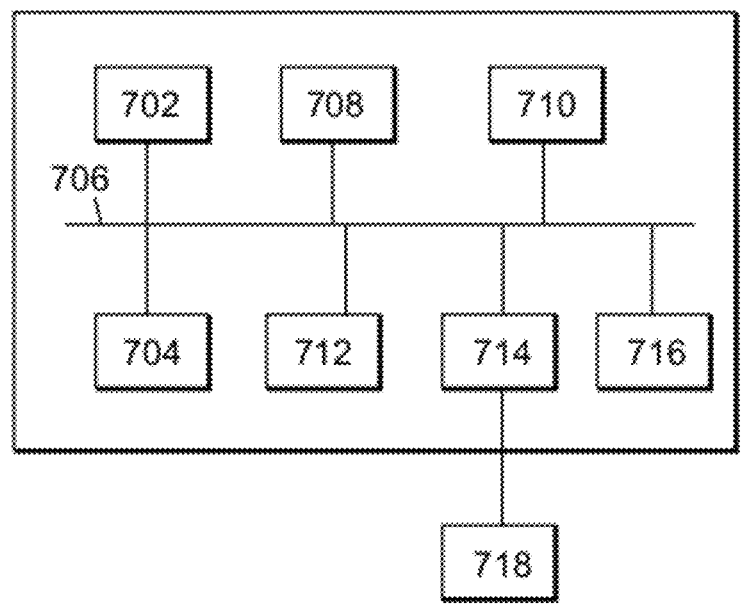
FIG. 7 is an illustration of a computing device that can implement one or more methods according to the present invention.

The embodiments of the systems of the present invention may include one or more computer systems to implement the various methods of the present invention. One exemplary computer system 700 is illustrated in FIG. 7. The computer system 700 may include a central processing unit (CPU) 702, which may be any general-purpose CPU. The present invention is not restricted by the architecture of the CPU or other components of the systems of the present invention as long as the CPU and other components support the inventive operations as described herein. The CPU may execute the various logical instructions according to embodiments of the present invention. For example, the CPU may execute the calculation of the principal stresses according to the exemplary operational flows described above.

In addition, the exemplary computer system may also include a memory 704. The memory 704 may be a random access memory (RAM), which may be SRAM, DRAM, SDRAM, or the like. The memory 704 may also include read-only memory (ROM) which may be PROM, EPROM, EEPROM, or the like. The RAM and ROM hold user and system data and programs, as is well known in the art. The memory 704 is configured to communicate with the CPU 702 through a bus 706.

The exemplary computer system also includes input/output (I/O) adapter 708, communications adapter 710, user interface adapter 712, and display adapter 714. I/O adapter, user interface adapter, and/or communications adapter may, in certain embodiments, enable a user to interact with the computer system in order to input information and obtain output information that has been processed by the computer system.

The I/O adapter preferably connects to one or more storage device(s) 716, such as one or more of hard drive, compact disc (CD) drive, floppy disk drive, tape drive, etc. to the exemplary computer system. The storage devices may be utilized when the RAM is insufficient for the memory requirements associated with storing data for operations of the elements described above (e.g., clam adjudication system, etc.). The communications adapter is preferably adapted to couple the computer system to a network, which may enable information to be input to and/or output from the computer system via the network (e.g., the Internet or other wide-area network, a local-area network, a public or private switched telephony network, a wireless network, any combination of the foregoing). The user interface adapter couples user input devices, such as keyboard, pointing device, and microphone and/or output devices, such as speaker(s) to the exemplary computer system. The display adapter is driven by the CPU to control the display on a display device 718 to, for example, display the output of the estimation of the principal stresses or graphs incorporating the estimated principal stresses.

It shall be appreciated that one or more embodiments is not limited to the architecture of the exemplary computer system. For example, any suitable processor-based device may be utilized for implementing the various elements described above (e.g., software for presenting the user interfaces, claim adjudication system, etc.), including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although one or more embodiments and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of one or more embodiments, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for processing 4-dimensional (4-D) seismic traces, said method comprising:
   receiving at least two vintages of seismic traces recorded by seismic receivers for a same subsurface area, wherein said seismic receivers are located at the ocean floor;
   applying up-down deconvolution to each of said vintages of seismic traces to obtain a representation of a reflectivity of said subsurface area from each vintage of seismic traces; and
   redatuming the up-down deconvolution result of each vintage from the ocean floor to a desired water depth of the ocean using a set of chosen water column parameters, to reduce one or more changes in said seismic traces associated with water layer variations between recordings of said series of seismic traces,
   wherein said redatumed seismic data is used to generate, by a computer, one or more images representing characteristics of said subsurface area.

2. The method of claim 1, further comprising:
   redatuming the up-down deconvolution result from the ocean floor to the surface of the ocean.

3. The method of claim 1, further comprising:
   applying the same water velocity for all vintages of data to redatum the up-down deconvolution result, wherein said redatuming attenuates changes in water velocity between recordings of the vintages of seismic traces.

4. The method of claim 1, further comprising:
   applying a same water depth for all vintages of data to redatum the up-down deconvolution result, wherein said redatuming attenuates changes in water depth between recordings of the vintages of seismic traces.

5. The method of claim 1, further comprising:
   applying up-down wavefield separation to separate an up-going wavefield from a down-going wave field for each of said vintages.

6. The method of claim 3, further comprising:
   using the same water depth for all vintages of data to redatum the up-down deconvolution result, wherein said redatuming attenuates changes in water velocity between recordings of the vintages of seismic traces.

7. The method of claim 1, wherein the 4-D seismic traces include a hydrophone component and three geophone components and the at least two vintages correspond to two different surveys that are separated in time but performed with the same seismic receivers provided at the same locations.

8. The method of claim 1, further comprising:
   separating up-going wavefields from down-going wavefields in the at least two vintages of seismic traces.

9. The method of claim 8, further comprising:
   applying a PZ separation to separate the up-going wavefields from the down-going wavefields.

10. The method of claim 8, further comprising:
    transforming the up-going wavefields and the down-going wavefields from the time-space domain to another domain.

11. The method of claim 10, further comprising:
    applying a fourier transform to the up-going wavefields and the down-going wavefields.

12. The method of claim 1, further comprising:
    applying a step of shot signature deconvolution so that a signature of a seismic source in the seismic traces is changed to a known, shorter waveform by using knowledge of the source waveform.

13. The method of claim 1, further comprising:
applying a step of source directivity deconvolution to eliminate a source waveform as the source waveform is contained in both the up-going wavefields and the down-going wavefields.

14. A device for determining one or more images representing characteristics of a subsurface area by processing 4-dimensional (4-D) seismic traces, said device comprising:
a processor configured to,
receive at least two vintages of seismic traces recorded by seismic receivers for a same subsurface area, wherein said seismic receivers are located at the ocean floor;
apply up-down deconvolution to each of said vintages of seismic traces to obtain a representation of a reflectivity of said subsurface area from each vintage of seismic traces; and
redatum the up-down deconvolution result of each vintage from the ocean floor to a desired water depth of the ocean using a set of chosen water column parameters, to reduce one or more changes in said seismic traces associated with water layer variations between recordings of said series of seismic traces,
wherein said redatumed seismic data is used to generate one or more images representing characteristics of said subsurface area.

15. A computer readable medium including computer executable instructions, wherein the instructions, when executed, implement a method for method for processing 4-dimensional (4-D) seismic traces, the method comprising:
receiving at least two vintages of seismic traces recorded by seismic receivers for a same subsurface area, wherein said seismic receivers are located at the ocean floor;
applying up-down deconvolution to each of said vintages of seismic traces to obtain a representation of a reflectivity of said subsurface area from each vintage of seismic traces; and
redatuming the up-down deconvolution result of each vintage from the ocean floor to a desired water depth of the ocean using a set of chosen water column parameters, to reduce one or more changes in said seismic traces associated with water layer variations between recordings of said series of seismic traces,
wherein said redatumed seismic data is used to generate one or more images representing characteristics of said subsurface area.

16. The medium of claim 15, further comprising:
redatuming the up-down deconvolution result from the ocean floor to the surface of the ocean.

17. The medium of claim 15, further comprising:
applying the same water velocity for all vintages of data to redatum the up-down deconvolution result, wherein said redatuming attenuates changes in water velocity between recordings of the vintages of seismic traces.

18. The medium of claim 16, further comprising:
applying a same water depth for all vintages of data to redatum the up-down deconvolution result, wherein said redatuming attenuates changes in water depth between recordings of the vintages of seismic traces.

19. The medium of claim 16, further comprising:
applying up-down wavefield separation to separate an up-going wavefield from a down-going wave field for each of said vintages.

20. The medium of claim 16, wherein the 4-D seismic traces include a hydrophone component and three geophone components and the at least two vintages correspond to two different surveys that are separated in time but performed with the same seismic receivers provided at the same locations.

* * * * *